Figure 3:
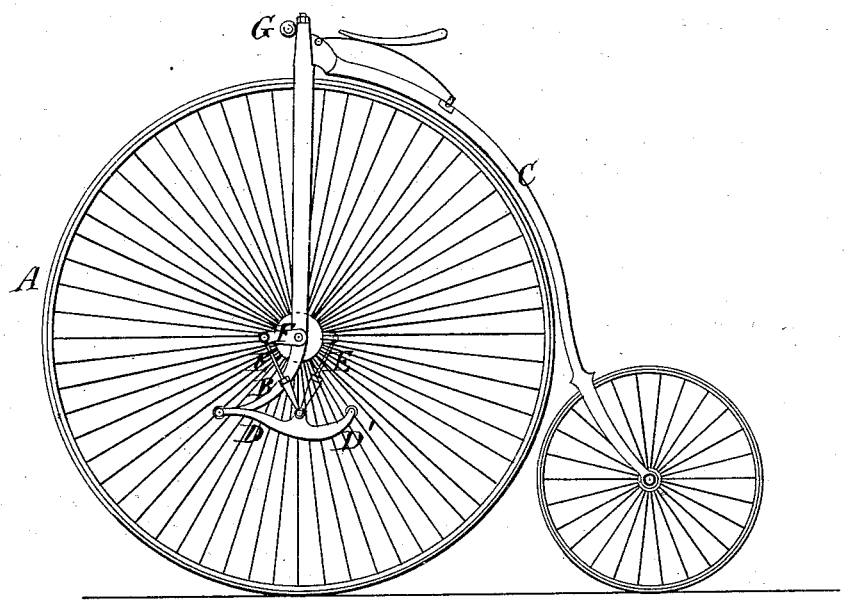

(No Model.) 2 Sheets—Sheet 1.
J. BEALE.
BICYCLE.
No. 280,558. Patented July 3, 1883.
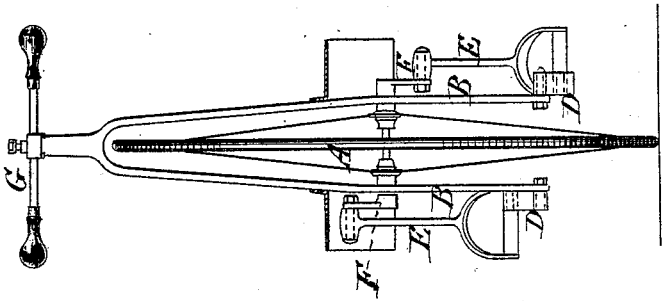
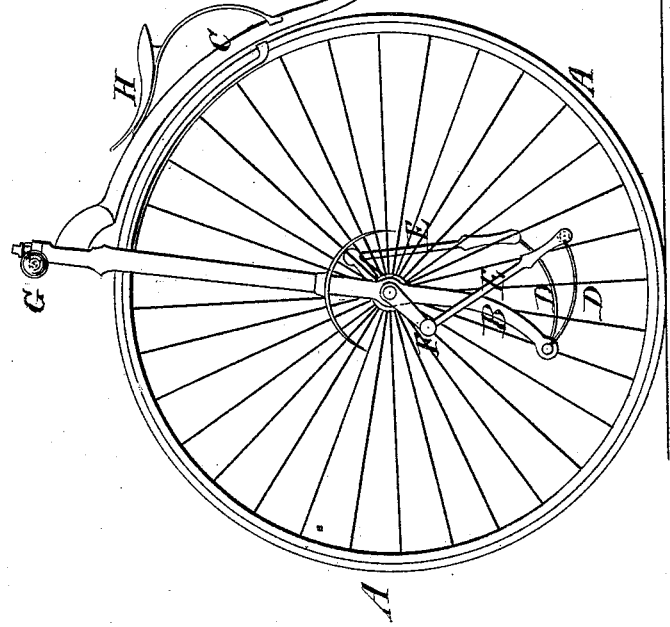
Witnesses:
Inventor:
John Beale
by his Attorneys
Brown & Brown (No Model.)  J. BEALE.  2 Sheets—Sheet 2.
BICYCLE.

No. 280,558.  Patented July 3, 1883.

UNITED STATES PATENT OFFICE.

JOHN BEALE, OF EAST GREENWICH, COUNTY OF KENT, ENGLAND.

BICYCLE.

SPECIFICATION forming part of Letters Patent No. 280,558, dated July 3, 1883.

Application filed January 3, 1883. (No model.) Patented in England January 25, 1878, No. 332.

*To all whom it may concern:*

Be it known that I, JOHN BEALE, of East Greenwich, in the county of Kent, England, engineer, have invented Improvements in the Construction of Bicycles, (for which I have obtained a patent in Great Britain, No. 332, bearing date January 25, 1878,) of which the following is a specification.

My invention has for its object the construction of bicycles in such a manner as to promote safety and protect riders from the strain in the region of the loins, to which they are exposed by the use of ordinary bicycles.

My invention relates to bicycles in which the motion or power is transmitted from the pedals through intermediate mechanism to the cranks attached to the fore or driving wheels, as distinguished from those bicycles in which the foot-pedals are placed directly on the cranks.

The invention consists in certain novel combinations of parts in the driving mechanism of a bicycle of the kind above described, as hereinafter specifically pointed out in the claim.

In the drawings, Figure 1 represents a side elevation of the bicycle; and Fig. 2 is an end view of the same, partly in section.

A is the fore or driving wheel. B B are elongations of the ordinary fork, which are jointed at their lower ends to the connecting-rods E E by means of the radius-rods D D. The connecting-rods E E, being caused to act upon the cranks F F, drive the fore wheel, A, as required.

C is the ordinary backbone, H the saddle, and G the steering-handle.

The saddle H is shown in Fig. 1 as placed, for safety, lower down the backbone C than is usual, so as to be well behind the axle of the wheel A, and at such a height from the ground that a rider is able to reach the same with his feet. The stirrups or foot-pedals at the lower end of the connecting-rods E E are placed in relation to the saddle H so as to correspond in distance in front thereof with the ordinary length of a person's step in walking, thereby avoiding the liability to undue strain of the rider in the region of the loins.

The bicycle may be propelled by working the stirrups at the end of the connecting-rods E E, as required. The bicycle may also be propelled by exerting pedal-power on elongations D' of the radius-rods D D beyond the ends of the connecting-rods E E, which radius-rods may be fitted with stirrups or otherwise for the purpose, as shown in Fig. 3. If the radius-rods D are prolonged or elongated, as at D', such elongations simply form pedals and connections between such pedals and the connecting-rods.

What I claim as my invention, and desire to secure by Letters Patent, is—

In a bicycle, the combination, with the driving-wheel A, provided with cranks F, and with the elongations B of the fork, of the rods E, connected at their upper ends directly with said cranks, radius-rods D, connecting the lower ends of said rods E with the elongations B of the fork, and foot pedals or stirrups, also connected with the lower ends of the rods E, substantially as described.

JOHN BEALE.

Witnesses:
WILLIAM SPENCE,
ALFRED H. JONES.